Oct. 9, 1962 F. GEORGES 3,057,228
TRANSMISSION MECHANISM
Filed May 26, 1958 2 Sheets-Sheet 1
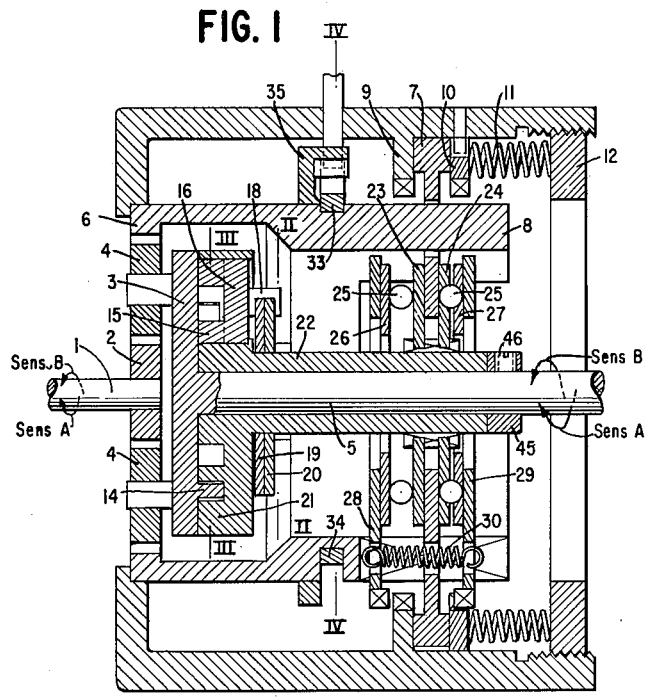
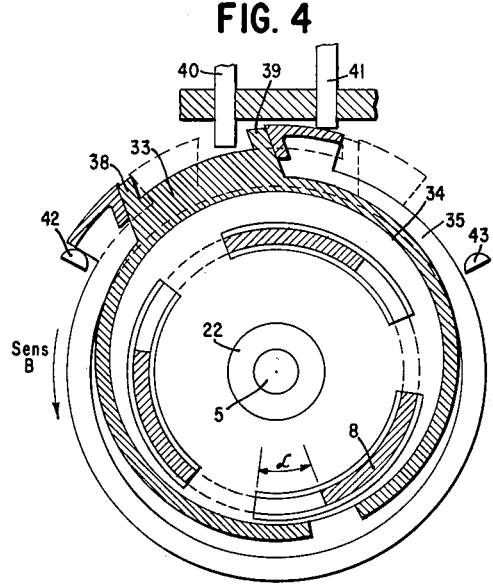
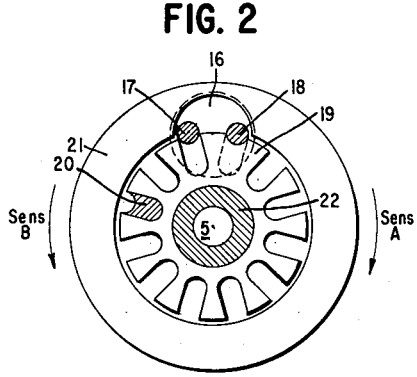
INVENTOR
FELIX GEORGES
BY *Watson, Cole, Grindle & Watson*
ATTORNEYS

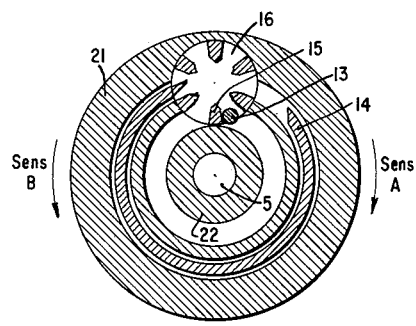
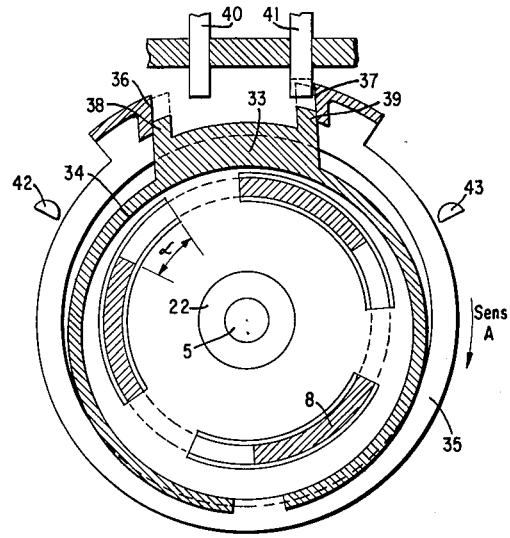
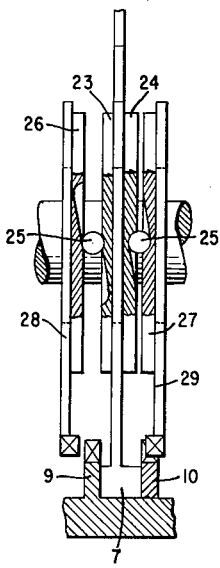
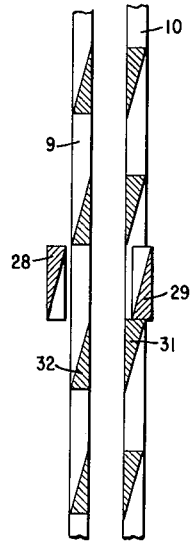

United States Patent Office 3,057,228
Patented Oct. 9, 1962

3,057,228
TRANSMISSION MECHANISM
Félix Georges, Uccle-Brussels, Belgium, assignor to Societe Auxiliaire d'Industrie (Sadi) S.P.R.L., Forest, Belgium
Filed May 26, 1958, Ser. No. 737,945
Claims priority, application Belgium June 3, 1957
6 Claims. (Cl. 74—801)

This invention relates to servo-motors and more particularly to transmissions designed to serve simultaneously as torque restrictors in transmitting the driving force of servo-motors.

Numerous types of transmissions of this kind are already known. Most are designed on a basis of multiple planetary gear trains and members which exercise continuous braking of certain components. Transmissions with two planetary gear trains and a brake belt are applied to produce continuous braking of certain components.

Furthermore, in certain known types, the signal members of the transmission controlling the actuation of the servo-motor were not always brought to their stop positions because of certain accidental locks due to small displacements of the control members.

One object of the present invention is to overcome these drawbacks.

Another object is to provide a transmission which enables a torque to control a signal and stop device after acting as a restrictor.

The transmission which is the subject matter of this invention, is mainly characterised in that it comprises a delaying device which is attached to a single planetary train and which locks for a controllable period a torque restrictor which, when released, permits the movement of a signal and stop device for the servo-motor.

In an embodiment of the invention, the planetary gear train includes a satellite carrier plate and a toothed ring which has lips co-operating with the torqu restrictor.

The delaying device is appended to the satellite carrier plate and consists essentially of a toothed pinion with several teeth which may be actuated by a lug fixed on the satellite carrier, the said pinion co-operating with toothed washers whose position can be adjusted, and which permit the lug to entrain a plate of a hollow shaft surrounding the shaft of the appliance only after the elapse of a given time.

The torque restrictor is preferably placed between discs with helicoidal grooves entrained by splines on the hollow shaft.

These co-operate with clawed plates which permit the toothedring to turn freely in one direction and to be stopped in the other if the shaft is stopped by a resistance exceeding a limit torque. The signal and stop device preferably consists of an eccentric or cam fitted round the toothed ring in such a way that when this ring is free, mmbers are set in movement by the liberation of the ring for the purpose of effecting the engine signal and stop operations, all components then automatically finding themselves in a position permitting travel in the reverse direction, the delay mechanism intervening.

In order to make the invention clear, an embodiment thereof is described below, by way of example only, with reference to the accompanying drawings, in which:

FIGURE 1 is a section through the axis of the appliance;

FIGURE 2 is a cross-section taken along the line II—II of FIGURE 1;

FIGURE 3 is a cross-section taken along the line III—III in FIGURE 1;

FIGURES 4 and 5 are cross-sections taken along the line IV—IV in FIGURE 1 in different positions;

FIGURE 6 shows the helicoidal grooves of one of the elements; and

FIGURE 7 shows the clawed plates of another element.

In these figures, the driving shaft 1 (FIGURE 1) on which is keyed a pinion 2, entrains by means of a satellite carrier plate 3 and the satellite wheels 4, an output shaft 5 and an internally toothed ring 6. Shaft 1 is driven by a suitable preferably electrical servo-motor (not shown). The ring 6 has longitudinally extending lips and is held from rotation by a torque restrictor disc 7 engaged on the lips 8. The lips 8 permit a certain angular displacement of the ring 6 before being held by the torque restrictor 7 (FIGURES 4 and 5).

The torque restrictor disc 7 is pressed between two plates 9 and 10 both fixed against rotation in a suitable stationary casing. The plate 10 is arranged to slide axially under the action of a series of springs 11, the pressure of which springs is controlled by the rotation of a screwed ring 12.

By turning the shaft 1 in the direction A (FIGURE 1) movement is transmitted by the satellite wheels 4 and the ring 6 to the satellite carrier plate 3 and the output shaft 5 which therefore turns in the same direction A.

The torque restrictor disc 7 comes under the control of a delaying component formed as follows:

A lug 13 (FIGURE 3) fixed on the plate 3 and a locking collar 14 turn freely with the plate 3 until the lug 13 abuts against a tooth 15 of a toothed pinion 16 having for example, six teeth, and entrains this pinion 16 in the direction B for one sixth of a revolution; this causes a lug 17, solid with the pinion 16 (FIGURE 2) to turn one sixth of a revolution and to engage in a notch of the toothed washers 19 and 20. The washers 19 and 20 are superimposed and each carry a small notch not so deep as the others, the relative position of which notch may be modified at will. When the lug 17 is engaged in a notch, another lug 18 likewise solid with the pinion 16 and diametrically opposite to the lug 17 is free.

After three revolutions of the plate 3, the lug 18 thus makes a semi-revolution and takes the place of the lug 17 in the following notch of the washers 19 and 20, and after three more revolutions, the lug 17 returns to its original position indicated in FIGURE 2 and engages in the small notch shown at 20.

At this moment the lug 13 abuts against the tooth 15 of the pinion 16 (FIGURE 3) and entrains a plate 21 with a hollow shaft 22 arranged round the shaft 5 in the direction A, rigidly connected with this output shaft 5. A collar 45, secured on output shaft 5 by set screw 46, abuts against one end of tubular shaft 22 to prevent axial displacement of shaft 22.

This means then that the number of free revolutions of the shaft 5 is the number of large notches between the small notches of the washers 19 and 20 multiplied by three, plus one revolution (in the case of FIGURE 2 we have $(2 \times 3) + 1 = 7$ revolutions).

Supported on the opposite faces of the torque restrictor disc 7 are discs 23 and 24 having helicoidal grooves (FIGURE 6) and entrained by the splines of the hollow shaft 22.

In these helicoidal grooves and in the opposed helicoidal grooves of the discs 26 and 27, which are pulled towards one another by springs (not shown) a series of balls 25 roll. On either side of the discs 26 and 27 rest two clawed plates 28 and 29 which are pulled towards one another by springs 30 and driven inversely of the shaft 22 by the lips 8 of the toothed ring 6.

At the moment when the discs 23 and 24 are entrained by the splines of the shaft 22 in the direction of rotation A, the disc 27 moves away from the disc 24 thus releasing the clawed plate 29 (FIGURES 6 and 7) from the teeth 31 of the sliding plate 10 and the disc 26 draws near the disc 23 engaging the clawed plate 28 in the teeth 32 of the fixed plate 9, which permits the ring 6 to turn freely in the direction A when the shaft 5, for any reason, is stopped by a resistance exceeding the torque from which the restrictor plate is set.

At this moment a cam 33, which is entrained by friction in an eccentric groove 34 (FIGURES 1, 4 and 5) entrains with it a concentric cam 35, which is provided on the axis of the appliance, by engaging the lips 36 and 37 of said cam 35.

Rotation of the cam 33 in direction B is prevented by a finger 39 resting against a piston 41 (indicated in dotted outline in FIGURE 4). The ring 6 continues to turn in direction B; after a half-revolution the finger 39 takes up a position under a piston 41 shown in FIGURE 5 and the lip 37 of the cam 35 abuts against the piston 41; during the second half-revolution in direction B, the finger 39 rises pushing the piston 41 and, having arrived on a level with the cam 35, causes this to turn until it abuts against a stop 42 (FIGURE 4) and maintains the piston 41 in the stop position of the motor for the rotation of the shaft 5 in the direction A.

At the moment when the shaft 5 is rotated in direction B, the ring 6 turns freely in direction A entraining with it the cams 33 and 35 sufficiently far for the finger 38 of the cam 33 to abut against the piston 40 and thus permit the piston 41 to take up its rest position shown in dotted outline (FIGURE 4).

If, at this moment, there occurs a greater resistance at the shaft 5 than the torque for which the restrictor was set, nothing happens. It can be seen, in point of fact, that the clawed plate 28 was and still is engaged in the claws of the fixed plate 9, which permits the restrictor disc 7 to turn in direction B, but to be stopped by the teeth 32 in direction A, during the number of revolutions controlled by the number of notches of the washers 19 and 20 which then changes the position of the clawed plates 28 and 29 as indicated in FIGURE 7, and therefore permits rotation in direction A.

The same effect of the cam 33 occurs in the direction A and then raises the piston 40 which stops the motor in the direction B after one revolution of the ring 6 in direction A.

According to this construction, it may be said that (a) The purpose of the free toothed ring during a certain angle of rotation is to permit the disengagement of the signal pistons to re-set the appliance ready to start in the two directions of rotation:

(b) The purpose of the slip of the cam on the ring for one revolution, before acting on the pistons, is to prevent the abrupt disengagement caused by small displacements of the ring when travelling caused by successive impulses in the same direction.

(c) The purpose of the eccentric cam is to disengage the corresponding piston in the respective direction of rotation after one half-revolution of the ring and to raise this piston during the half-revolution following in order to be locked in position by the holding cam;

(d) The purpose of the delaying device is to prevent the simultaneous action of the eccentric and holding cams and the torque restrictor in order to allow the motor to act with its maximum torque during the time predetermined by the delaying device.

The following is a description of the essential operational features of the invention as contained in the transmission above described:

The gear 16 which functions as an intermittently driven element of a Geneva gear is freely rotatably journaled in the wheel 21 for rotation about an axis parallel to the axes of shafts 1 and 5 but located eccentrically thereto. The teeth 15 of this gear project axially from an end face of the gear and function in the manner of pins for successive engagement and intermittent rotation by the pin 13 (shown in FIGURE 3), which is fixed on the rotating satellite carrier plate 3.

It will thus be apparent that the gear 16 and the satellite carrier plate 3 constitute cooperating elements of a Geneva gearing for converting the constant rotation of the plate 3 to intermittent rotary motion of the gear 16. It is important to note, however, that the extent of such rotary movement of the gear 16 is restricted to a predetermined range less than a complete rotation which range is governed by the elements 19 and 20, to permit a predetermined amount of rotation of the output shaft 5 and of any parts driven by it at the full torque imparted or delivered to the output shaft 5 from the drive shaft 1. A predetermined amount of rotation displacement of the gear 16 acts to interengage the driving pin 18 of this gear with the plates 19 and 20 which are splined on the sleeve 22 to establish a positive driving connection between the satellite carrier plate 3 and the sleeve 22 at the end of the range of permitted free rotational movement or lost motion between these parts. In other words, the foregoing mechanism 16, 18, 19, 20 and 21 constitutes a lost motion means operated to interconnect the hollow shaft and the driven shaft for rotation together following a predetermined plurality of rotations of the driven shaft relative to the power shaft. The establishment of such interconnection by the lost motion means will impart a driving rotational force and a corresponding torque to the torque resistor disc or torque restrictor defined by the slip brake element 7 together with its associated elements 9, 10, 23 and 24. When such torque becomes sufficient to rotate the disc 7 against the frictional holding force of its cooperating slip brake member, this will permit rotation of the internal gear 6 in place of the plate 3 and output shaft 5, the motion of which may be arrested by a predetermined resistance to their continued rotation.

Such rotation of the gear 6 and its associated parts, including the cam ring and its associated cam mechanism heretofore described, will then control the cam mechanism for acting on one or the other of the motor controlled pistons 40 or 41, as the case may be, to shut off a driving motor connected to the shaft 1.

I claim:

1. A combined power transmission and control means for a motor comprising a generally cylindrical casing, a drive shaft journaled coaxially through said casing and adapted for connection to a motor to be driven thereby, a driven shaft coaxially aligned with said drive shaft and supported for rotation in said casing, a single planetary gear train for transmitting motion from said drive shaft to said driven shaft, said gear train comprising a drive gear fixed on said drive shaft, a planetary gear carrier fixed on said driven shaft, a plurality of planetary gears rotatably supported on said carrier in mesh with said drive gear, an internal ring gear supported for rotation coaxially to said driving and driven shafts and in mesh with the respective planetary gears, a hollow shaft rotatable on said driven shaft, lost motion means operative to interconnect said hollow shaft in driven relation to said carrier after first permitting a predetermined amount of relative rotation of the carrier and driven shaft with respect to said hollow shaft, a torque restrictor comprising a slip brake connecting said hollow shaft to said casing and having a lost motion connection with said internal gear to permit rotation of said internal gear incident to slippage of said brake, cam mechanism frictionally connected to said internal gear for rotary movement therewith through a predetermined range in either direction of rotation of said internal gear, and motor control means positioned on said casing for engagement and actuation by said cam mechanism at the opposite extremities of its said range of movement.

2. A combined power transmission and control means for a motor, as defined in claim 1, in which said internally toothed ring has longitudinally extending lips, which lips co-operate with said torque restrictor.

3. A combined power transmission and control means for a motor, as defined in claim 1, in which said hollow shaft is splined, and further including helicoidally grooved discs mounted on either side of said torque restrictor and entrained by said splined shaft.

4. A combined power transmission and control means for a motor, as defined in claim 1, in which said hollow shaft is splined, and further including helicoidally grooved discs and clawed plates mounted on either side of said torque restrictor and entrained in rotation by said splined shaft, said helicoidally grooved discs co-operating with said clawed plates to permit said toothed ring to turn freely in one direction and to be stopped in the other direction if the motor is stopped, by a resistance exceeding the limit torque after the functioning of the delaying device.

5. In a combined power transmission and control means for a motor, the subcombination of elements comprising a casing, a drive shaft and a driven shaft both rotatably supported in said casing in relative axial alignment, a planetary gear train interconnecting said shafts to transmit rotary movement from said drive shaft to said driven shaft, said planetary gear train comprising a drive gear fixed on said drive shaft, a planetary gear carrier supported for rotation on and coaxially with said driven shaft, a planetary gear rotatably supported on said carrier in mesh with said drive gear, an internal ring gear disposed for rotation coaxially to said drive and driven shafts and in mesh with said planetary gear, a hollow shaft rotatable on said drive shaft, lost motion means operative to interconnect said hollow shaft and said driven shaft for rotation together following a predetermined plurality of rotations of said driven shaft relative to the hollow shaft, said lost motion means comprising a wheel fixedly carried by said hollow shaft, a driven element of a Geneva gearing carried by said wheel for limited rotation about an axis eccentric to said drive and driven shafts, said driven element being provided with relatively circumferentially spaced teeth, means fixedly carried by said hollow shaft for engaging and confining said rotation of the driven element to a given range less than a complete rotation, said planetary gear carrier having a driving lug thereon for successive engagement with the teeth of the said driven element to intermittently rotate said element through a portion of a revolution incident to each complete revolution of the said wheel.

6. The mechanism defined in claim 5 including frictional holding means normally restraining the internal ring gear against rotation, whereby said ring gear absorbs a predetermined torque exerted thereon by the reactionary force resulting from driving of said driven shaft, said holding means permitting rotation of said ring gear when said reactionary force exceeds the frictional holding power of said holding means.

References Cited in the file of this patent

UNITED STATES PATENTS

| 1,330,790 | Dean | Feb. 17, 1920 |
| 1,702,479 | Mosch et al. | Feb. 19, 1929 |
| 2,205,235 | Arnold et al. | Jan. 18, 1940 |
| 2,434,480 | Anderson | Jan. 13, 1948 |
| 2,547,475 | Larsen | Apr. 3, 1951 |
| 2,761,331 | Buescher | Sept. 4, 1956 |
| 2,791,920 | Ray | May 14, 1957 |